US012563095B2

(12) United States Patent
Roach et al.

(10) Patent No.: US 12,563,095 B2
(45) Date of Patent: Feb. 24, 2026

(54) METHOD THAT ADEQUATELY PROTECTS THE AUTHENTIC IDENTITY AND PERSONAL DATA OF A NATURAL PERSON AND REMOTELY CONFIRMS THE AUTHENTIC IDENTITY OF THIS NATURAL PERSON THROUGH A TRUSTED ENTITY TO A BENEFICIARY PART

(71) Applicant: TDIS INTELLECTUAL PROPERTIES B.V., Willemstad (CW)

(72) Inventors: Hensley Roach, Willemstad (CW); Daniel Kalkhoven, Willemstad (CW); Oscar Matroos, Willemstad (CW); Roy Everts, Willemstad (CW)

(73) Assignee: TDIS INTELLECTUAL PROPERTIES B.V., Willemstad (CW)

( * ) Notice: Subject to any disclaimer, the term of this patent is extended or adjusted under 35 U.S.C. 154(b) by 538 days.

(21) Appl. No.: 18/006,640

(22) PCT Filed: Mar. 24, 2021

(86) PCT No.: PCT/IB2021/052438
§ 371 (c)(1),
(2) Date: Jan. 24, 2023

(87) PCT Pub. No.: WO2022/018522
PCT Pub. Date: Jan. 27, 2022

(65) Prior Publication Data
US 2023/0300173 A1      Sep. 21, 2023

(30) Foreign Application Priority Data
Jul. 24, 2020   (NL) ..................................... 2026156

(51) Int. Cl.
*H04L 9/40*          (2022.01)

(52) U.S. Cl.
CPC .......... *H04L 63/18* (2013.01); *H04L 63/0838* (2013.01); *H04L 63/0861* (2013.01)

(58) Field of Classification Search
None
See application file for complete search history.

(56)                References Cited

U.S. PATENT DOCUMENTS

2019/0297075 A1      9/2019   Kaladgi et al.

FOREIGN PATENT DOCUMENTS

WO         2010/128451 A2      11/2010

OTHER PUBLICATIONS

"Digital Identity Guidelines Authentication and Lifecycle Management", Grassi et al., NIST Special Publication 800-63B, initial date Jun. 2017 with updates Mar. 2, 2020, found at https://nvlpubs.nist.gov/nistpubs/specialpublications/nist.sp.800-63b.pdf (Year: 2020).*
nist.sp.800-63b.*

* cited by examiner

*Primary Examiner* — Piotr Poltorak
(74) *Attorney, Agent, or Firm* — FisherBroyles, LLP; Roger L. Browdy; James E. Mrose

(57)                ABSTRACT

A method that adequately protects the authentic identity and personal data of a natural person and remotely confirms the authentic identity of this natural person to a beneficiary party upon a request solely made by the natural person to the trusted entity. The trusted entity stores the authentic identity and personal data of the natural person to remotely confirm the authentic identity to the beneficiary party.

15 Claims, 1 Drawing Sheet

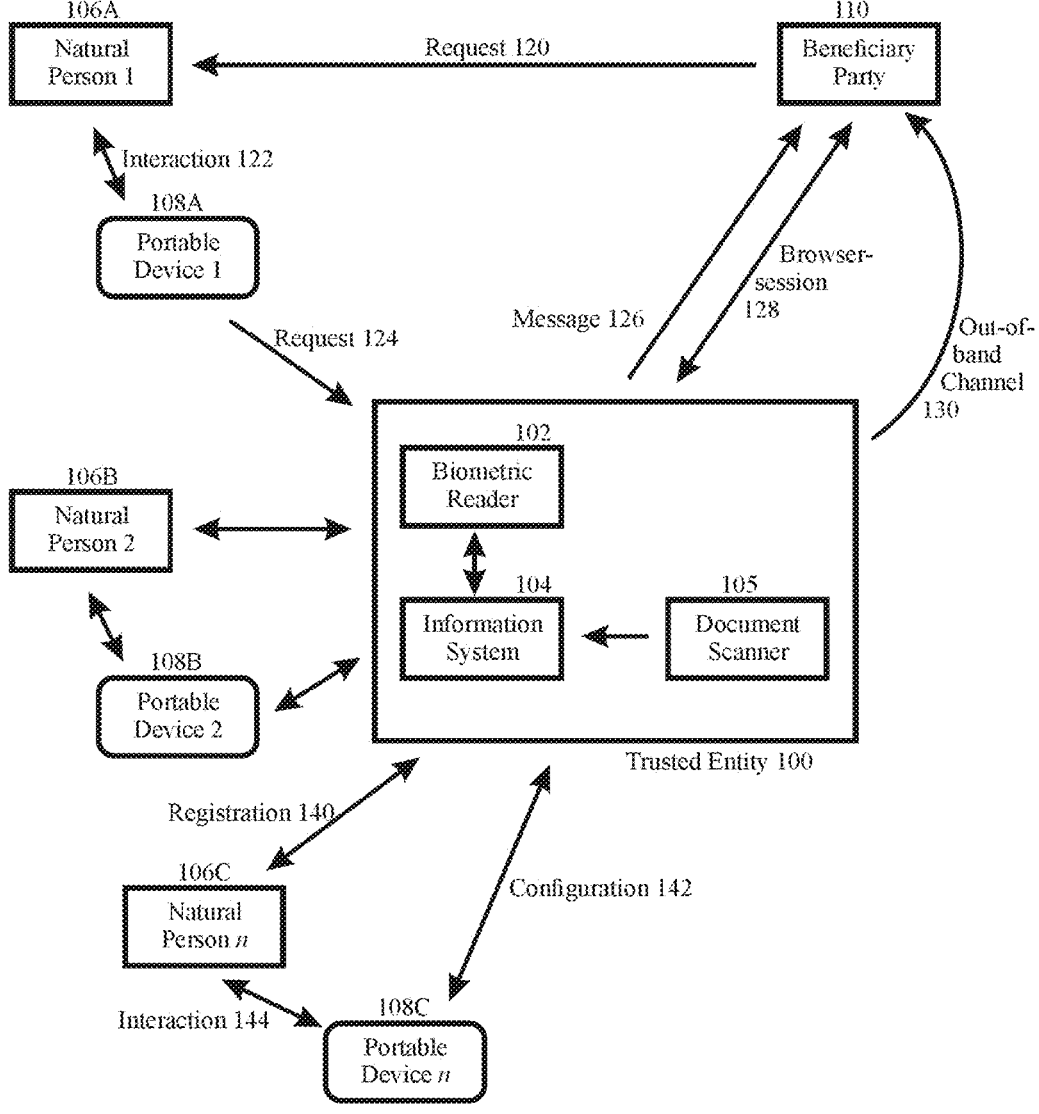

METHOD THAT ADEQUATELY PROTECTS THE AUTHENTIC IDENTITY AND PERSONAL DATA OF A NATURAL PERSON AND REMOTELY CONFIRMS THE AUTHENTIC IDENTITY OF THIS NATURAL PERSON THROUGH A TRUSTED ENTITY TO A BENEFICIARY PART

TITLE OF INVENTION

A method that adequately protects the authentic identity and personal data of a natural person and remotely confirms the authentic identity of this natural person through a trusted entity to a beneficiary party.

TECHNICAL FIELD

This invention relates to digital identity. More specifically using an automated system to remotely confirm the identity of a natural person.

BACKGROUND ART

Prior arts closest to the TDIS solution are owned by: TRANSACTIONSECURE, LLC (US 2008/0184351 A1) which solution includes a trusted entity confirming the authentic identity of a natural person;

Hooyubusiness.com and Jumio.com sites. These last two companies provide through their sites identity confirmation services to beneficiaries after collecting e.g. a selfie, social media information and a picture of the ID document of applicants;

KALADGI MOHAMMED MUJEEB ET AL (US 2019/297075 A1) and PRIVYLINK PRIVATE LTD (WO 2010/128451 A2) both provides users authentication services by means of a multi-factor authentication system.

BACKGROUND OF THE INVENTION

The internet has introduced new opportunities to conduct business. Traditional financial services such as opening a bank account and conducting over the counter banking transactions and postal mail are currently done remotely. The Internet also created additional ways through which fraudsters can take advantage of their victims. Identity fraud through the Internet is currently a long-standing and stubborn problem. Fraudsters deceive their victims as they consciously hide or do not disclose their real identity when conducting remote business.

According to the FBI IC3 report published in May 2018, total losses caused by Internet fraud exceeded US $1.4 billion in 2017. The most common crime types reported by victims were non-payment, non-delivery and personal data breaches. These victims desperately seek ways to retrieve the authentic identity of the fraudster to reimburse their unexpected financial losses.

The effective solution to prevent identity fraud is reached when a trusted entity (e.g. a government entity) verifies and securely confirms the true identity of a natural person to a beneficiary party, prior to the beneficiary party conducting a transaction with the natural person, who might otherwise be a potential fraudster. The solution must also protect personal data of the natural person from being compromised.

Existing identity confirmation services pose a risk to e.g. the privacy, continuity and trustworthiness of the service and also insufficiently protect or secure personal data (e.g. a shared secret key) against criminals that may intercept and utilize that data for identity fraud purposes.

An effective identity confirmation solution must therefore adhere to the following criteria:

1. A registration process where the authentic identity of the person is unequivocally determined by the trusted entity examining physical documents by specialized hardware/software and/or trained officer, after which identity information is stored in an information system.

2. Biometric information of the natural person and information of a configurable portable device must be collected and linked to the authentic identity stored above such that only the natural person is able to request the trusted entity to confirm his identity to a beneficiary.

3. Any data stored or in transit which can be related to the natural person, must be secured and protected from eavesdropping, man-in-the-middle attack or any other type of (cyber) attack to prevent identity fraud.

The previously referenced prior art solutions however are still vulnerable to identity fraud. The TRANSACTIONSECURE, LLC solution e.g. does not comply with criteria number three, as the shared secret key (their unique code) may be stolen and misused by criminals for impersonation purposes:

1. Via interception through a man-in-the-middle attack or eavesdropping during transmission. The shared secret key is transmitted from the trusted entity to the natural person and from the natural person to the beneficiary party (in the prior art of TRANSACTIONSECURE, LLC referenced as Transactional Entity or Beneficiary Entity). The beneficiary party visits the trusted entity site and provides the shared secret key to the trusted entity.

2. Accessing the shared secret key in storage. The shared secret key may be stolen from the natural person or beneficiary party's computer.

Identity confirmation services as provided by Hooyubusiness.com and Jumio.com do not comply with criteria numbers one and two, as the natural person's identity is e.g. not unequivocally determined by a trusted entity. Secondly, these companies obtain and analyze personal data received from social media for the confirmation of the identity. This identification is less secure as it has not been previously linked to the authentic identity and physical documents of a natural person which data is subsequently stored in a trusted database.

KALADGI MOHAMMED MUJEEB ET AL (US 2019/297075 A1) and PRIVYLINK PRIVATE LTD (WO 2010/128451 A2) both are multi-factor user authentication systems and do not provide identification confirmation services to the beneficiary party.

SUMMARY OF THE INVENTION

TDIS adheres to all three criteria and therefore will grant an internet user (read beneficiary party) more confidence and trust in doing business after receipt of its counter partner's TDI. TDIS stores identity information of a natural person in a trusted database after examining all relevant data. A secure configurable portable device and the natural person's biometric data linked to that device, are both used for authentication and access to the trusted entity's information system to request confirmation of the identity of the natural person by the trusted entity to the beneficiary party. TDIS does not exchange any shared secret keys to any party! Therefore it is not susceptible to eavesdropping, man-in-the-middle attack or any other type of (cyber) attack. All information exchanged between the natural person and the trusted entity is encrypted using biometrics and contains no identity-related information about the natural person. TDIS is a trusted, secure and a real-time identity confirmation system.

The proposed TDIS is a method to remotely confirm and protect the authentic identity of a natural person through a trusted entity, to a beneficiary party. In order to do this, the natural person sends a request with captured biometric information to the trusted entity using a preconfigured portable device. Before using the TDIS, the natural person must have registered with the trusted entity at which his/her portable device has been configured for remote access to the information system.

The complete sequence of events for getting a TDI of a natural person is as follows:

1. A beneficiary party requests the authentic identification from the natural person and the beneficiary party provides its e-mail address and out-of-band channel, such as a telephone number;
2. The natural person, uses the preconfigured portable device, captures biometric information and places a request to the trusted entity;
3. The trusted entity sends an informational message (containing no code, identifier, etc.) to the e-mail address of the beneficiary party;
4. The beneficiary party visits the secured website (HTTPS) of the trusted entity, creates a browser-session and submits its e-mail address;
5. The trusted entity creates an OTP tied to the browser-session and sends this via the out-of-band channel to the beneficiary party;
6. The beneficiary party via the same browser-session submits the received OTP to the trusted entity;
7. The trusted entity compares the received OTP with the sent OTP and if they match, will provide the authentic identity information of the natural person via the browser-session to the beneficiary party.

Used Definitions

The following definitions are used throughout the text and are provided here for reference:

Acceptable means of communication: verbal communication (such as spoken language), written communication (such as paper-based, e-mail, etc.) and non-verbal communication (like sign language).

Authentic identification: the process to determine the authentic identity of a natural person.

Authentic identity: true personal data belonging to a natural person containing full name, date of birth, place of birth, nationality and sex.

Beneficiary party: a legal entity or a natural person that is interested in the authentic identity of a natural person.

Biometric data: data from a natural person's physical characteristic such as fingerprints, face, iris and retina.

Biometric information: information obtained after processing a natural person's biometric data.

Biometric reader: a device capable of reading biometric data.

Client-server model: a model where one or more computers communicates with a server using a communication protocol, such as web and e-mail servers.

Document scanner: a device capable to read and determine the authenticity of an identification document.

Entity: a legal authority trusted by its citizens such as a government entity.

HTTPS: Hyper Text Transfer Protocol Secure, a protocol for handling requests between a client (browser) and a server (webserver).

Identification document: a valid and legal document issued by a government entity through which the authentic identity can be determined.

Information system: a system which collects and stores for disclosure, operational and managerial purposes the identification- and biometric information of natural persons.

Man-in-the-middle attack: intercepting communication data exchange between two parties.

Natural person: a human being.

Out-of-band channel: the medium used to transmit out-of-band data, such as a SMS or PSTN.

Out-of-band data: data which is delivered via an independent communication channel.

OTP: One Time Password, a password (time constraint or not) that changes with each use to make it more difficult to gain unauthorized access to confidential digital information.

Personal data: all data relating to an identified or identifiable living natural person.

Portable device: a device on which the TDI application can be installed such as a smart phone, laptop, tablet with capabilities to capture biometric data.

Preconfigured portable device: a portable device on which the TDI application has been installed and configured.

Pre-register: the process a natural person must undergo at the entity to obtain access to the TDIS.

PSTN: Public Switched Telephone Network, the name of the telephone network used by any network provider worldwide.

Registration information: authentic identity information, biometric information and e-mail address.

Shared secret key: a piece of data, known only to the parties involved, in a secure communication such as a password or randomly chosen bytes.

SMS: Short Message Service, a service to send/receive short messages using a mobile phone.

Trusted entity: an entity trusted by its citizens, such as a government entity.

TDI (Trusted Digitalized Identity): a digitalized authentic identity and digitalized personal data of a natural person confirmed by an entity to a beneficiary party.

TDI application: the application installed and configured on a portable device to connect to the information system.

TDIS (Trusted Digitalized Identity System): the hardware, software, network communication (devices), operational procedures and human resources that provides trusted, secure and real-time identity confirmation services.

BRIEF DESCRIPTION OF THE DRAWING

FIG. 1 shows the various aspects of the TDIS including interrelated workings of the method.

DETAILED DESCRIPTION

The following detailed description refers to the accompanied drawings. The same reference numbers in the drawings are used.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

In order for a natural person to use the TDIS and remotely confirm the authentic identity to a beneficiary party, the natural person must first register at the trusted entity as described below.

For illustrative purposes the natural person in the following example is denoted as "Natural Person n (106C)", but can be any natural person such as Natural Person 1 (106A), Natural Person 2 (106B), and so on.

1. The Natural Person n (106C) shows up in person at the Trusted Entity (100) in order to request for a TDI. The Natural Person n (106C) must possess a portable device n (108C) capable to capture biometric data.
2. During this Registration (140) process the Natural Person n (106C) must provide a valid identification document, upon which a trained employee at the Trusted Entity (100) collects registration information and starts recording this information in the Information System (104).
3. The provided identification document is scanned by the Document Scanner (105) to determine its authenticity.
4. In order to verify the authentic identity of the Natural Person n (106C), a photograph of the Natural Person n (106C) is taken using the Biometric Reader (102) and digitally compared with the photograph on the identification document previously scanned using the Document Scanner (105).
5. After successful verification of the authentic identity, required biometric information of the Natural Person n (106C) will be collected via the Biometric Reader (102) for recording purposes into the Information System (104).
6. The Portable Device n (108C) of the Natural Person n (106C) must undergo Configuration (142) by the Trusted Entity (100). During this process the TDI application is installed on the Portable Device n (108C) and configured accordingly for mainly secure communication with the Information System (104).
7. Via an Interaction (144) with the Portable Device n (108C) the Natural Person n's (106C) biometric information is linked to the TDI application.

At this point the TDI application is configured on the Portable Device n (108C) for secure remote communication with the Trusted Entity (100).

The following section describes how the TDIS remotely confirms an authentic identity to a Beneficiary Party.

For illustrative purposes the natural person in the following example is denoted as "Natural Person 1 (106A)", but can be any natural person such as Natural Person 2 (106B), Natural Person n (106C), and so on.

8. A Beneficiary Party (110) via any acceptable means of communication Request (120) a Natural Person 1 (106A) to remotely provide his/her authentic identity. In order to receive this authentic identity, as part of this Request (120) the Beneficiary Party (110) provides an e-mail address and an out-of-band channel to the Natural Person 1 (106A).
9. The Natural Person 1 (106A) performs an Interaction (122) with the corresponding Portable Device 1 (108A) on which the TDI application is installed. The Natural Person 1 (106A) supplies the TDI application the Beneficiary Party's (110) e-mail address and out-of-band channel.
10. The TDI application encrypts the e-mail address and out-of-band channel, using biometric information of the Natural Person 1 (106A) into the Request (124) for transmission to the Trusted Entity (100).
11. The Portable Device 1 (108A) securely connects via Internet to the Trusted Entity (100) to deliver the encrypted Request (124) to the Information System (104).

The Trusted Entity (100):
12. After authenticating the Portable Device 1 (108A), it receives the encrypted Request (124) sent via the Portable Device 1 (108A).
13. Retrieves the corresponding Natural Person 1's (106A) stored biometric information (previously pre-registered) from the Information System (104).
14. Using this biometric information decrypts the Request (124) to obtain the e-mail address and out-of-band channel encrypted in the Request (124).
15. The Trusted Entity (100) creates a link between the Beneficiary Party's (110) e-mail, out-of-band channel and the Natural Person 1's (106A) identification and stores this link in the Information System (104).
16. The Trusted Entity (100) sends an e-mail Message (126) without any code or identifier to the Beneficiary Party (110) notifying the Beneficiary Party, that the Natural Person's authentic identity is available for review.

Once the Beneficiary Party (110) receives the e-mail Message (126) from the Trusted Entity (100):
17. The Beneficiary Party (110) creates a browser-session with the Trusted Entity's (100) website and enters his/her e-mail address.
18. The Trusted Entity (100) looks up this e-mail address in the Information System (104) and finds the corresponding link created earlier.
19. The Trusted Entity (100) retrieves from the link the corresponding out-of-band channel belonging to the Beneficiary Party (110).
20. The Trusted Entity (100) creates an OTP, stores it in the Information System (104) and sends it via the corresponding out-of-band Channel (130) of the Beneficiary Party (110) to the Beneficiary Party (110).
21. The Beneficiary Party (110) receives the OTP on his/her out-of-band Channel (130) and enters it in the same Browser-session (128) previously established with the Trusted Entity (100).
22. The Trusted Entity (100) compares the received OTP with the corresponding stored OTP and if there is a match, the Trusted Entity (100) will retrieve the corresponding authentic identification of the Natural Person 1 (106A) from the Information System (104) and displays it to the Beneficiary Party (110) via the Browser-session (130).

The invention claimed is:
1. A method for remotely protecting and confirming the authentic identity of a natural person, through a trusted entity, to a beneficiary party, the method comprising:
the beneficiary party requests the authentic identity from the natural person and provides an e-mail address and an out-of-band channel to the natural person;
the natural person authenticates herself with the trusted entity using a preconfigured portable device and submits an encrypted request containing the e-mail address and out-of-band channel of the beneficiary party;
the trusted entity decodes the received information using the stored biometric data of the natural person, and creates a relationship between the e-mail address, out- of-band channel and the authentic identity of the natural person and stores this relationship in the information system;

the trusted entity sends an informational message to the e-mail address of the beneficiary party;

the beneficiary party receives the e-mail message and subsequently visits the secured website of the trusted entity and provides her e-mail address within an established browser-session;

the trusted entity uses this e-mail address to retrieve the corresponding out-of-band channel stored in the relationship;

the trusted entity generates a One Time Password OTP, stores this and subsequently sends this to the corresponding out-of-band channel of the beneficiary party;

the beneficiary party receives the OTP on her out-of-band channel and submits this into the same browser-session; and the trusted entity compares the received OTP with the stored OTP and if they match, submits a Trusted Digitalized Identity TDI of the natural person to the beneficiary party within the browser-session.

2. The method of claim 1, wherein the trusted entity manages an information system which among others collects identity- and biometric information of natural persons and securely stores this information for retrieval purposes.

3. The method of claim 2, where a portable device of the natural person is configured for secured communication with the information system.

4. The method of claim 3, wherein the TDI application installed on the configured portable device, interfaces uniquely with the corresponding natural person's biometric information.

5. The method of claim 1, wherein natural persons must individually pre-register their identity- and biometric information with the trusted entity, where after verification of this information, a TDI can be granted.

6. The method of claim 1, further comprising:

the beneficiary party using any acceptable means of communication requests the authentic identity of the natural person and therefore provides an e-mail address and her out-of-band channel.

7. The method of claim 1, where the natural person uses the portable device to capture biometric information and securely sends an encrypted request containing the e-mail address and out-of-band channel of the beneficiary party to the trusted entity via Internet.

8. The method of claim 1, where the trusted entity receives the encrypted request from the natural person, determines its authenticity and retrieves among others the previously stored biometric information of the natural person to decrypt the request from the natural person.

9. The method of claim 8, wherein the trusted entity decrypts the request from the natural person and subsequently relates the e-mail address and out-of-band channel of the beneficiary party to the identity information of the natural person stored within the information system.

10. The method of claim 8, where the trusted entity sends an informational message via e-mail to the beneficiary party to inform this party upon the availability of a natural person's digital identity.

11. The method of claim 10, where the beneficiary party receives the informational message, establishes a browser-session with the secured website of the trusted entity and submits her e-mail address.

12. The method of claim 11, wherein the trusted entity uses this e-mail address to retrieve the corresponding out-of-band channel stored within the relationship.

13. The method of claim 12, wherein the trusted entity generates and stores an OTP specifically for said browser-session and sends this to the out-of-band channel of the beneficiary party.

14. The method of claim 13, wherein the beneficiary party receives the OTP on her out-of-band channel and enters this within the same browser-session.

15. The method of claim 14, wherein the trusted entity compares the received OTP with the stored OTP, relates the received OTP to said browser-session and if these correspond, provides the TDI of the natural person within the same browser-session to the beneficiary party.

* * * * *